(12) United States Patent
Park et al.

(10) Patent No.: US 7,708,428 B2
(45) Date of Patent: May 4, 2010

(54) BACKLIGHT ASSEMBLY AND DISPLAY DEVICE HAVING THE SAME

(75) Inventors: Se-Ki Park, Suwon-si (KR); Byung-Choon Yang, Seongnam-si (KR); Joo-Woan Cho, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 206 days.

(21) Appl. No.: 11/668,863

(22) Filed: Jan. 30, 2007

(65) Prior Publication Data

US 2008/0043463 A1 Feb. 21, 2008

(30) Foreign Application Priority Data

Feb. 3, 2006 (KR) ............. 10-2006-0010438

(51) Int. Cl.
*F21V 1/00* (2006.01)
(52) U.S. Cl. ............... 362/241; 362/231; 362/240; 362/247; 362/297; 362/346
(58) Field of Classification Search ........ 362/231, 362/240, 241, 247, 297, 346
See application file for complete search history.

(56) References Cited

U.S. PATENT DOCUMENTS

| 6,964,489 B2 * | 11/2005 | Blume et al. ............ 362/27 |
| 2005/0195619 A1 | 9/2005 | Tseng |
| 2005/0281050 A1 * | 12/2005 | Chou ............... 362/612 |
| 2006/0221612 A1 * | 10/2006 | Song et al. ........... 362/247 |
| 2007/0070625 A1 * | 3/2007 | Bang ............... 362/240 |
| 2007/0153515 A1 * | 7/2007 | Hong et al. ............ 362/237 |

* cited by examiner

*Primary Examiner*—Sandra L O'Shea
*Assistant Examiner*—Meghan K Dunwiddie
(74) *Attorney, Agent, or Firm*—F. Chau & Associates, LLC

(57) ABSTRACT

A backlight assembly includes a plurality of light source units and a partition member. Each of the light source units includes a plurality of light sources generating different wavelengths of light from each other and a circuit board on which the light sources are mounted. The partition member is disposed between the light source units to partially transmit and partially reflect the light generated from the light source units.

20 Claims, 11 Drawing Sheets

BACKLIGHT ASSEMBLY AND DISPLAY DEVICE HAVING THE SAME

CROSS-REFERENCE TO RELATED APPLICATIONS

This application relies for priority upon Korean Patent Application No. 2006-10438 filed on Feb. 3, 2006, the content of which is herein incorporated by reference in its entirety.

BACKGROUND OF THE INVENTION

1. Field of the Invention

The present invention relates to a backlight assembly and a display device having the backlight assembly. More particularly, the present invention relates to a backlight assembly capable of improving display quality and a display device having the backlight assembly.

2. Description of Related Art

In a display driving method of a backlight assembly for a display device, a color filter method may be used to achieve a desired color is obtained using red, green and blue pixels. In contrast, in a field sequential driving method, a red light, a green light and a blue light are sequentially emitted for one frame, each of the red, green and blue light being emitted for a predetermined time in synchronization with data applied to a display element to thereby generate a desired color.

In the field sequential driving methods a plurality of monochromatic colors is sequentially emitted to generate one color. Thus, color mixing may result in the field sequential driving method deteriorating color reproducibility, which is different from the color filter method.

Therefore, a need exists for a backlight assembly capable of improving display quality and a display device having the backlight assembly.

SUMMARY OF THE INVENTION

According to an embodiment of the present invention, a backlight assembly includes a plurality of light source units and a partition member. Each of the light source units includes a plurality of light sources each configured to generate light having different wavelengths from each other and a circuit board on which the light sources are mounted. The partition member is disposed between the light source units to partially transmit and partially reflect the light generated from the light source units.

The partition member may include a first partition portion and a second partition portion disposed on the first partition portion. The first partition portion may reflect the light generated from the light source units, and the second partition portion may partially transmit and partially reflect the light generated from the light source units.

The first partition portion may include a first material, and the second partition portion may include a second material that is different from the first material. Here, the first material has a first optical reflectivity and the second material has a second optical reflectivity that is smaller than the first optical reflectivity.

For example, the second partition portion has a refractive index of about 1.0 to about 2.0. The second partition portion may include at least one of polymethyl methacrylate (PMMA) and poly carbonate (PC).

The partition member may further include a third partition portion disposed on the second partition portion. The third partition portion may include a third material having a third optical reflectivity smaller than the second optical reflectivity.

The second partition portion may include a light-reflecting portion reflecting the light generated from the light source units, and a light-transmitting portion transmitting the light generated from the light source units. For example, the second partition portion is patterned in a shape of comb teeth, and each of the comb teeth may be rounded at least one of a top point and a bottom point. Alternatively, a plurality of holes may be formed at the second partition portion.

A first height of the first partition portion may be greater than or equal to a second height of the second partition portion. For example, the first height of the first partition portion is in a range of about 20 mm to about 30 mm, and the second height of the second partition portion is in a range of about 5 mm to about 25 mm.

The partition member may have a column shape having a cross sectional profile of one of a triangle and a truncated triangle. For example, a vertex angle of the triangle and the truncated triangle is in a range of about 1 degree to about 15 degrees.

The backlight assembly may further include a reflective sheet that reflects the light generated from the light source units, and the light source units and the partition member may be disposed on the reflective sheet.

The partition member may include at least two materials. For example, an optical reflectivity of the partition member gradually decreases from a lower portion to an upper portion of the partition member.

According to an embodiment of the present invention, a display device includes a display unit and a backlight assembly. The display unit displays an image using light. The backlight assembly is configured to provide the light to the display unit, and includes a plurality of light source units and a partition member. Each of the light source units includes a plurality of light sources each light source configured to generate different wavelengths of light from each other and a circuit board on which the light sources are mounted. The partition member is disposed between the light source units to partially transmit and partially reflect the light generated from the light source units.

According to the above, a partition member disposed between light source units partially transmits and partially reflects light generated from the light source units, thereby increasing color reproducibility of the light and improving uniformity of the light.

BRIEF DESCRIPTION OF THE DRAWINGS

The present invention will become more apparent by describing in detailed exemplary embodiments thereof with reference to the accompanying drawings, in which.

DETAILED DESCRIPTION OF PREFERRED EMBODIMENTS

Figure 1:
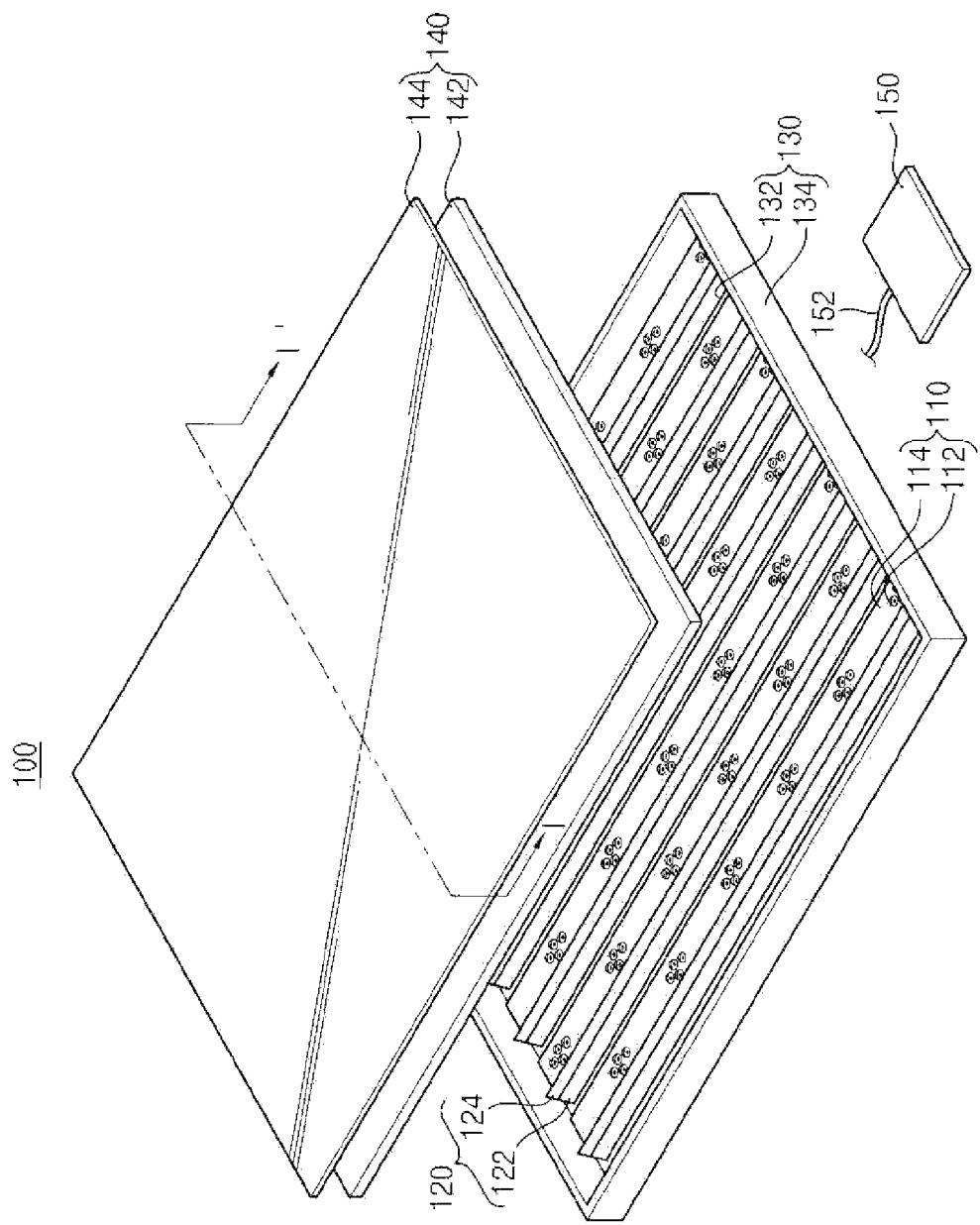
FIG. 1 is an exploded perspective view illustrating a backlight assembly according to an exemplary embodiment of the present invention.

The present invention now will be described more fully hereinafter with reference to the accompanying drawings, in which exemplary embodiments of the invention are shown. This invention may, however, may be embodied in many different forms and should not be construed as limited to embodiments set forth herein; rather, embodiments are provided so that this disclosure will be thorough and complete, and will fully convey the scope of the invention to those skilled in the art. It will be understood that when an element is referred to as being "on" or "onto" another element, it may be directly on the other element or intervening elements may also be present. In contrast, when an element is referred to as being "directly on" another element, there are no intervening elements present. Like reference numerals refer to similar or identical elements throughout.

Figure 2:
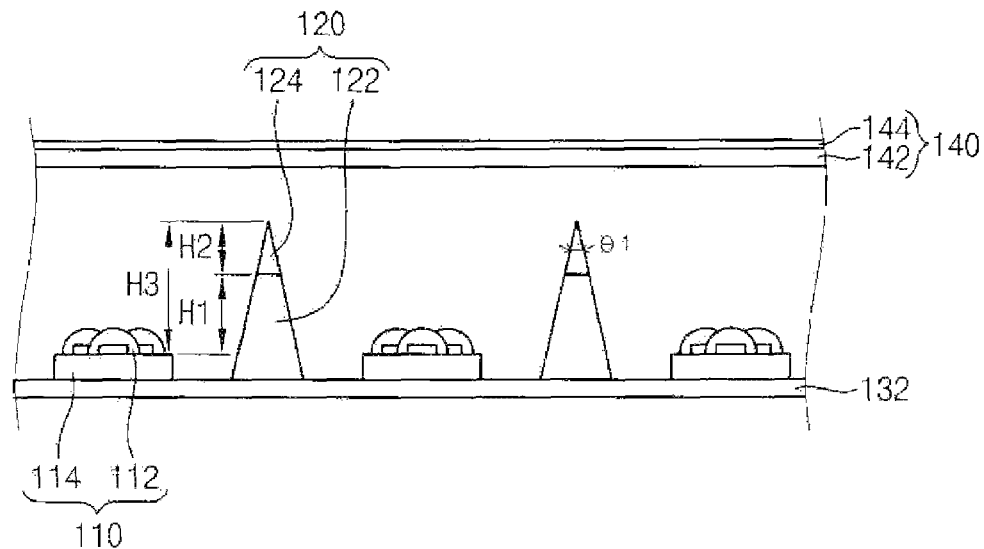
FIG. 2 is a partial cross-sectional view taken along a line I-I' in FIG. 1.

FIG. 1 is an exploded perspective view illustrating a backlight assembly according to an exemplary embodiment of the present invention. FIG. 2 is a partial cross-sectional view taken along a line I-I' in FIG. 1.

Referring to FIG. 1, a backlight assembly 100 includes a plurality of light source units 110, a partition member 120, a receiving container 130 and an optical member 140.

Each of the light source units 110 includes a plurality of light sources 112 and a circuit board 114. The light sources 112 of a light source unit 110 each generate different wavelengths of light. The light sources 112 are mounted on the circuit board 114.

The circuit board 114 includes, for example, a printed circuit board or a metal-coated board including a printed circuit board on which a metal having a high thermal conductivity is coated. A power supply line (not shown) is formed on the circuit board 114 to apply an externally provided power source to the light sources 112.

The light sources 112 include a red light source, a green light source and a blue light source. For example, one red light source, two green light sources and one blue light source define one light source group, and a plurality of light source groups are spaced apart from each other on the circuit board 114. However, the numbers of red light sources, green light sources and blue light sources are not limited to the above description.

The red light source includes a red light emitting diode (LED) generating red light, each of the green light sources includes a green LED generating green light, and the blue light source includes a blue LED generating blue light.

The red light source, the green light source and the blue light source include a lens covering the red, green and blue LEDs, respectively. The lenses diffuse the light generated from the red, green and blue LEDs to increase an effective light-emitting area of the light sources 112. As shown in FIGS. 1 and 2, the lens may be, for example, a top-emitting type having a dome shape. Other configurations may be implemented for example, the lens may be a side-emitting type.

As shown in FIGS. 1 and 2, for example, the light source groups of adjacent light source units 110 are disposed in a zigzag shape.

The red light source, the green light source and the blue light source defining each light source group may have substantially the same disposition or a different disposition from the red light source, the green light source and the blue light source of the adjacent light source group(s) within the same light source unit 110 and in the adjacent light source unit(s) 110.

The partition member 120 is disposed between adjacent light source units 110. When the light source units 110 sequentially generates light having different colors, the partition member 120 divides the light source units 110 to substantially prevent different colored light from being mixed.

The partition member 120 partially transmits and partially reflects the light generated from the light source units 110. Thus, the partition member 120 includes, for example, at least two materials.

In FIGS. 1 and 2, the partition member 120 includes a first partition portion 122 and a second partition portion 124 disposed on the first partition portion 122.

The first partition portion 122 reflects the light generated from the light source units 110. The second partition portion 124 partially transmits and partially reflects the light generated from the light source units 110.

The first partition portion 122 includes a first material, and the second partition portion 124 includes a second material that is different from the first material. For example, the first partition portion 122 and the second partition portion 124 may be comprised of the first material and the second material, respectively. Alternatively, the first partition portion 122 and the second partition portion 124 may include a first layer coated thereon and a second layer coated thereon, respectively, and the first layer and the second layer may include the first material and the second material, respectively.

The first material of the first partition portion 122 has a first optical reflectivity, and the second material of the second partition portion 124 has a second optical reflectivity that is smaller than the first optical reflectivity. The first material of the first partition portion 122 may include a material having a high optical reflectivity, for example, such as metal. The second material of the second partition portion 124 may include a material capable of partially transmitting and partially reflecting light, for example, such as polymethyl methacrylate (PMMA) poly carbonate (PC), etc.

For example, the second partition portion 124 has a refractive index of about 1.0 to about 2.0.

The receiving container 130 includes a bottom plate 132 and a side portion 134 extending from an edge of the bottom plate 134 to form a receiving space, and successively receives the light source units 110 and the optical member 140 in the receiving space. The receiving container 130 includes, for example, a metal having high strength.

The optical member 140 includes a light-diffusing plate 142 disposed over the light source units 1100 to diffuse the light generated from the light source units 110. The optical member 140 may further include an optical sheet 144 for achieving desired optical characteristics of the diffused light. The optical sheet 144 includes, for example, a light-diffusing sheet diffusing and/or a light-condensing sheet condensing the diffused light in a front direction to improve front luminance of the diffused light.

The backlight assembly 100 may further include a power supply device 150 generating a driving voltage for emission of the light source units 110. The driving voltage generated from the power supply device 150 is applied to the light source units 110 through a power source wire 152.

Figure 3:
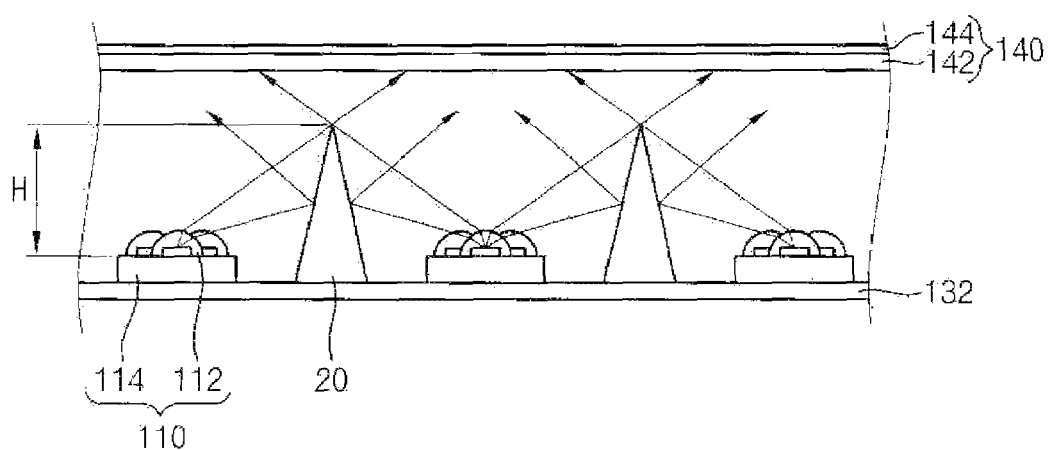
FIG. 3 is a partial cross-sectional view illustrating an optical path in a backlight assembly having a partition member according to a comparative example.

FIG. 3 is a partial cross-sectional view illustrating an optical path in a backlight assembly having a partition member according to a comparative example.

Referring to FIG. 3, a backlight assembly 10 according to a comparative example includes a partition member 20 disposed between the light source units 110.

The partition member 20 includes a material having a high optical reflectivity. Thus, the partition member 20 may reflect the light generated from the light source units 110.

Particularly, as shown in FIG. 3, the light generated from the light source units 110 travels toward the partition member 20, and is reflected on a surface of the partition member 20.

The partition member 20 is spaced apart from the optical member 140 by a predetermined interval, and has a predetermined height 'H' with respect to an upper face of the circuit board 114 of the light source units 110.

Thus, a portion of the light generated from one light source unit 110 passes over a top point of the partition member 20 and travels to a position of the adjacent light source unit 110. A portion of the light generated from the light source unit 110 is reflected on the surface of the partition member 20, and does not travel to the position of the adjacent light source unit 110.

When the height 'H' is relatively low, a large quantity of the light generated from the light source unit 110 passes over the top point of the partition member 20 and travels to the position of the adjacent light source unit 110. When the height 'H' is relatively high, a large quantity of the light generated from the light source unit 110 is reflected on the surface of the partition member 20 and does not travel to the position of the adjacent light source unit 110.

When a large quantity of the light generated from the light source unit 110 passes over the top point of the partition member 20 and travels to the position of the adjacent light source unit 110, the light generated from the light source units 110 adjacent to each other may be mixed, and the light generated from the light source units 110 adjacent to each other may have lowered color reproducibility.

When a large quantity of the light generated from the light source unit 110 is reflected on the surface of the partition member 20 and does not travel to the position of the adjacent light source unit 110, the light generated from the light source units 110 adjacent to each other may have improved color reproducibility, and the light generated from the light source units 110 adjacent to each other may not be mixed.

Figure 4A:
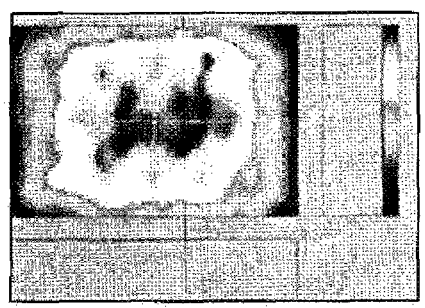
FIGS. 4A to 4C are graphs showing simulation results of optical distributions in accordance with a height of the partition member illustrated in FIG. 3.
Figure 4B:
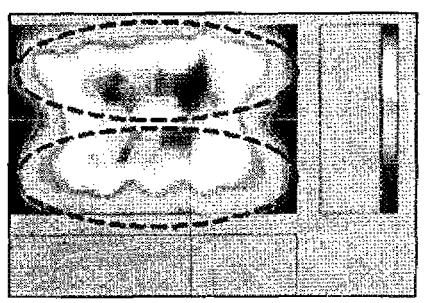
Figure 4C:
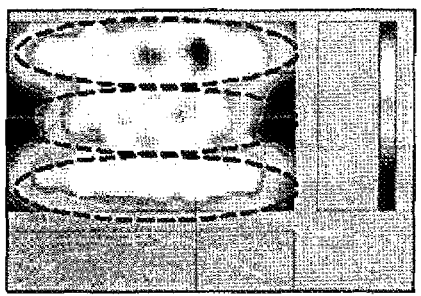

FIGS. 4A to 4C are graphs showing simulation results of optical distributions in accordance with a height of the partition member illustrated in FIG. 3. The simulation was performed by using an "Advanced System Analysis Program (ASAP)" (trade name manufactured by Breault Research Organization (BRO) Inc. in the U.S.).

In the simulation, an interval from the upper face of the circuit board 114 of the light source unit 110 to the optical member 140 was about 50 mm. FIG. 4A is a graph showing a simulation result of an optical distribution for a partition member height 'H' of about 10 mm. FIG. 4B is a graph showing a simulation result of an optical distribution for a partition member height 'H' of about 30 mm. FIG. 4C is a graph showing a simulation result of an optical distribution for a partition member height 'H' of about 50 mm.

Referring to FIG. 4A, when the height 'H' of the partition member 20 is about 10 mm, most of the light generated from the light source unit 110 passes over the top point of the partition member 20 and travels to the position of the adjacent light source unit 110. Thus, the light generated from the light source units 110 adjacent to each other may be mixed. As a result, the backlight assembly 10 has a uniform optical distribution as shown in FIG. 4A.

Referring to FIG. 48 the height 'H' of the partition member 20 is about 30 mm, a portion of the light generated from the light source unit 110 passes over the top point of the partition member 20 and travels to the position of the adjacent light source unit 110. A portion of the light generated from the light source unit 110 is reflected on the surface of the partition member 20 and does not travel to the position of the adjacent light source unit 110. Thus, the light generated from the light source units 110 adjacent to each other may not be mixed in comparison with FIG. 4A. As a result, the backlight assembly 10 has an optical distribution having two bands as shown in FIG. 48.

Referring to FIG. 4C, the height 'H' of the partition member 20 is about 50 mm, most of the light generated from the light source unit 110 is reflected on the surface of the partition member 20 and does not travel to the position of the adjacent light source unit 110. Thus, the light generated from the light source units 110 adjacent to each other may not be mixed in comparison with FIGS. 4A and 48. As a result, the backlight assembly 10 has an optical distribution having three bands as shown in FIG. 4C.

Figure 5:
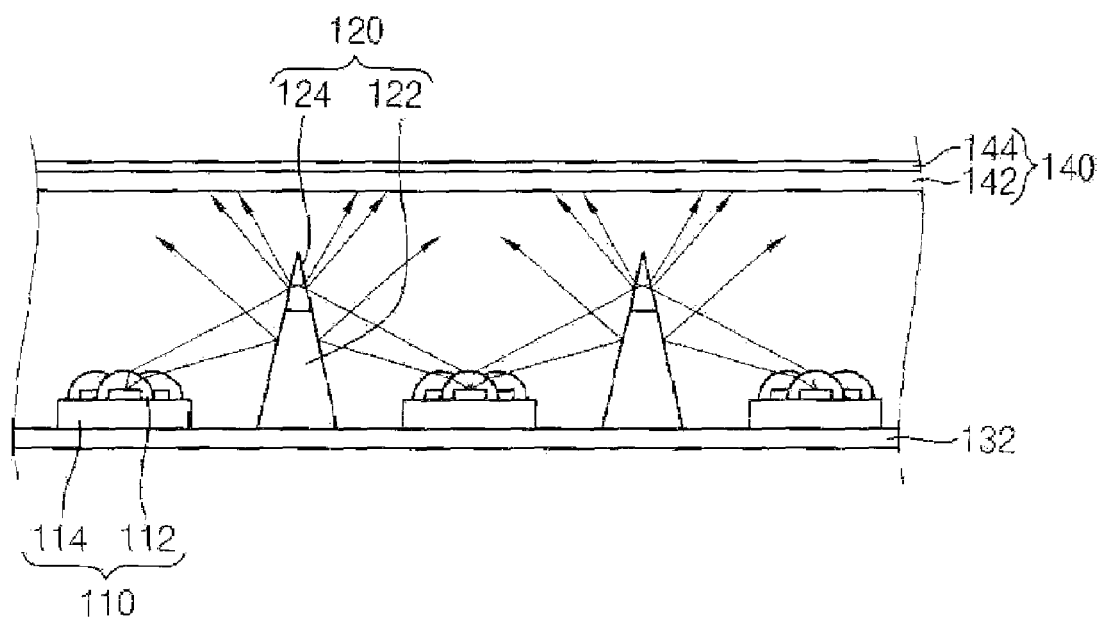
FIG. 5 is a partial cross-sectional view illustrating an optical path in a backlight assembly having the partition member illustrated in FIGS. 1 and 2.

FIG. 5 is a partial cross-sectional view illustrating an optical path in a backlight assembly having the partition member illustrated in FIGS. 1 and 2.

Referring to FIG. 5, the partition member 120 of the backlight assembly 100 according to an exemplary embodiment of the present invention includes the first partition portion 122 and the second partition portion 124. The first partition portion 122 and the second partition portion 124 have different materials from each other. The second partition portion 124 is disposed on the first partition portion 122 and may be integrally formed with the first partition portion 122.

The first partition portion 122 of the partition member 120 includes a material having a high optical reflectivity. The second partition portion 124 of the partition member 120 includes a material capable of transmitting and reflecting light. Thus, the partition member 120 may partially reflect and partially transmit the light generated from the light source units 110.

Particularly, as shown in FIG. 5, the light generated from the light source units 110 advances toward the partition member 120. Light traveling toward the first partition portion 122 of the light generated from the light source units 110 is reflected on the first partition portion 122. Light traveling toward the second partition portion 124 of the light generated from the light source units 110 is partially reflected on and partially transmitted through the second partition portion 124.

The partition member 120 is spaced apart from the optical member 140 by a predetermined interval. As shown in FIG. 2 the first partition portion 122 has a first height H1 from the upper face of the circuit board 114 of the light source unit 110, and the second partition portion 124 has a second height H2 from an upper face of the first partition portion 122. Thus, the partition member 120 has a third height H3 from the upper face of the circuit board 114 of the light source unit 110, the third height H3 being equal to a sum of the first and second heights H1 and H2.

Since the partition member 120 is spaced apart from the optical member 140 by a predetermined interval, a portion of the light generated from the light source unit 110 passes over the top point of the partition member 120 and travels to the position of the adjacent light source unit 110.

A portion of the light generated from the light source unit 110 is reflected on a surface of the first partition portion 122 of the partition member 120 and does not travel to the position of the adjacent light source unit 110.

A portion of the light generated from the light source unit 110 is partially reflected on a surface of the second partition portion 124 of the partition member 120, and is transmitted through the second partition portion 124 along an optical path changed according to Snell's law.

Accordingly, when the first height H1 of the first partition portion 122 and the second height H2 of the second partition portion 124 are controlled, a portion of the light generated from the light source unit 110 is reflected on the second partition portion 124 corresponding to an upper portion of the partition member 120, and thus the color reproducibility of the light generated from the light source unit 110 is not lowered. In addition, a portion of the light generated from the light source unit 110 is transmitted through the second partition portion 124 corresponding to the partition member 120 to mix the light generated from the adjacent light source units 110.

For examples the first height H1 of the first partition portion 122 is greater than or equal to the second height H2 of the second partition portion 124.

In an exemplary embodiments, when the optical member 140 is spaced apart from the upper face of the circuit board 114 of the light source unit 110 by a distance of about 50 mm, the first height H1 of the first partition portion 122 may be in a range of about 20 mm to about 30 mm and the second height H2 of the second partition portion 124 may be in a range of about 5 mm to about 15 mm.

When the first height H1 of the first partition portion 122 is smaller than about 20 mm, an optical path of the light generated from the light sources 112 forms a predetermined angle with respect to the circuit board 114. Thus, the partition member 120 may not serve as a partition member.

When the first height H1 of the first partition portion 122 is greater than about 30 mm or the second height H2 of the second partition portion 124 is smaller than about 5 mm, an effect of the first partition portion 122 for reflecting light is dominant over an effect of the second partition portion 124 for partially reflecting and partially transmitting light the backlight assembly 100 may have an optical distribution having bands, which is similar in FIGS. 4B and 4O.

When the second height H2 of the second partition portion 124 is greater than about 15 mm, an effect of the second partition portion 124 for partially reflecting and partially transmitting light is dominant over an effect of the first partition portion 122 for reflecting light, the partition member 120 may not serve as a partition member.

Figure 6A:
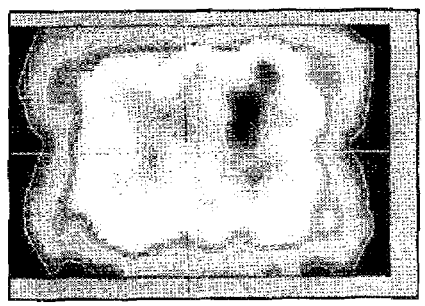
FIGS. 6A to 6C are graphs showing simulation results of optical distributions in accordance with a height of the partition member illustrated in FIGS. 1 and 2.
Figure 6B:
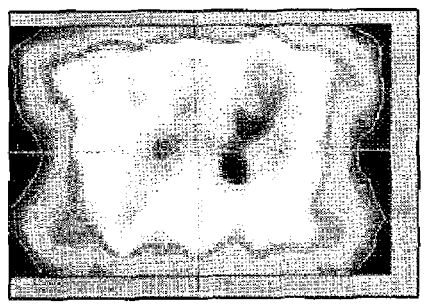
Figure 6C:
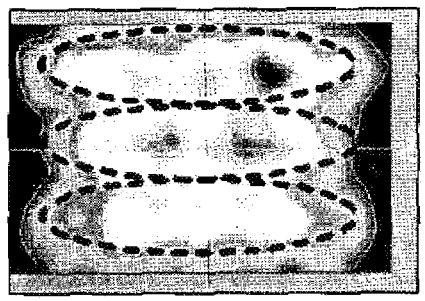

FIGS. 6A to 6C are graphs showing simulation results of optical distributions in accordance with a height of the partition member illustrated in FIGS. 1 and 2. The simulation was performed by using an "Advanced System Analysis Program (ASAP)" (trade name manufactured by Breault Research Organization (BRO) Inc. in U.S.).

In the present exemplary simulation, an interval from the upper face of the circuit board 114 of the light source unit 110 to the optical member 140 is about 50 mm, and the first height H1 of the first partition portion 122 is about 25 mm. FIG. 6A is a graph showing a simulation result of an optical distribution when the second height H2 of the second partition portion 124 is about 5 mm. FIG. 6B is a graph showing a simulation result of an optical distribution when the second height H2 of the second partition portion 124 is about 10 mm. FIG. 6C is a graph showing a simulation result of an optical distribution when the second height H2 of the second partition portion 124 is about 20 mm.

Referring to FIG. 6A, when the second height H2 of the second partition portion 124 is about 5 mm and the third height H3 of the partition member 120 is about 30 mm, the backlight assembly 100 has a uniform optical distribution. In comparison with an optical distribution illustrated in FIG. 4B, when the partition member 120 of the backlight assembly 100 has a height of about 30 mm that is substantially the same as that of the partition member 20 of the backlight assembly 10 illustrated in FIG. 3S the backlight assembly 100 may have more uniform optical distribution.

Referring to FIG. 68, when the second height H2 of the second partition portion 124 is about 10 mm and the third height H3 of the partition member 120 is about 35 mm, the backlight assembly 100 has a uniform optical distribution. In comparison with an optical distribution illustrated in FIG. 4B, when the partition member 120 of the backlight assembly 100 has a height of about 35 mm that is greater than that of the partition member 20 of the backlight assembly 10 illustrated in FIG. 3, the backlight assembly 100 may have a more uniform optical distribution.

In FIGS. 6A and 6B, the backlight assembly 100 may have a uniform optical distribution because a portion of the light generated from the light source unit 110 is reflected on the surface of the first partition portion 122 disposed at a lower portion of the partition member 120 and a portion of the light generated from the light source unit 110 is transmitted through the second partition portion 124 disposed at an upper portion of the partition member 120 along a changed optical path according to Snell's law.

Referring to FIG. 6C, when the second height H2 of the second partition portion 124 is about 20 mm and the third height H3 of the partition member 120 is about 45 mm, the backlight assembly 100 has an optical distribution having three bands, which is similar in FIG. 4C.

Referring again to FIGS. 1 and 2, the partition member 120 has; for example, a column shape having a triangular cross-sectional profile. The triangular cross-sectional profile of the partition member 120 may be an equilateral triangle. A vertex angle $\theta 1$ of the partition member 120, for example, has a range of about 1 degree to about 15 degrees.

Other configurations of the partition member 120 may be implemented, for example, the partition member 120 may have a column shape having a cross-sectional profile of a truncated triangle. For example, the cross-sectional profile of the partition member 120 may be a parallelogram, an upper side of which is smaller than a lower side. A vertex angle of the triangle defined by extending left and right sides of the parallelogram may have a range of about 1 degree to about 15 degrees.

As shown in FIGS. 1 and 2, a first side face of the first partition portion 122 and a second side face of the second partition portion 124 are continuous. The first side face of the first partition portion 122 and the bottom plate 132 of the receiving container 130 forms a first inclined angle, and the second side face of the second partition portion 124 and the bottom plate 132 of the receiving container 130 forms a second inclined angle. The first inclined angle is substantially the same as the second inclined angle.

Other configurations may be implemented, for example, the first inclined angle formed by the first side face of the first partition portion 122 and the bottom plate 132 of the receiving container 130 may be different from the second inclined angle formed by the second side face of the second partition portion 124 and the bottom plate 132 of the receiving container 130.

The backlight assembly 100 may further include a reflective sheet that reflects the light generated from the light source units 110. In this case, the light source units 110 and the partition member 120 may be disposed on the reflective sheet. Other configurations may be implemented, for example, a reflective material may be coated between the light source unit 110 and the partition member 120. The reflective material may be additionally coated on the circuit board 114.

In FIGS. 1 and 2, the partition member 120 includes the first partition portion 122 and the second partition portion 124. The partition member 120 may further include a third partition portion disposed on the second partition portion 124. The third partition portion includes a third material having a third optical reflectivity. For example, the third partition portion may be comprised of the third material. Alternatively, the third partition portion may include a third layer coated thereon, and the third layer may include the third material. The third optical reflectivity of the third partition portion may be smaller than the second optical reflectivity of the second partition portion 124. According to exemplary embodiment, the third optical reflectivity may be greater than the second optical reflectivity of the second partition portion 124, and smaller than the first optical reflectivity of the first partition portion 122.

In FIGS. 1 and 2, the partition member 120 includes the first partition portion 122 and the second partition portion 124 including different materials from each other. Other configurations may be implemented, for example, the partition member 120 may be formed by mixing at least two materials. Here, the partition member 120 may be formed to have an optical reflectivity that gradually decreases from a lower portion to an upper portion of the partition member 120.

In FIGS. 1 and 2, since each light source unit 110 of the backlight assembly 100 integrally generates light, the partition member 120 may be disposed along a longitudinal direction of the circuit board 114 of the light source unit 110. Other configurations may be implemented, for example, when each light source unit 110 of the backlight assembly 100 generates light independently with respect to each light source group, the partition member 120 may be disposed between the light source groups adjacent to each other.

The first height H1 of the first partition portion 122, the second height H2 of the second partition portion 124, the third height H3 of the partition member 120, the vertex angle θ1 of the partition member 120, etc. may be set in accordance with a dimension and a configuration of the backlight assembly 100. For example, the first height H1 of the first partition portion 122, the second height H2 of the second partition portion 124, the third height H3 of the partition member 120, the vertex angle θ1 of the partition member 120, etc. may be changed by a height and a shape of the backlight assembly 100, a position of the optical member 140, positions of the light source units 110, an arrangement of the light sources 112, etc.

Figure 7:
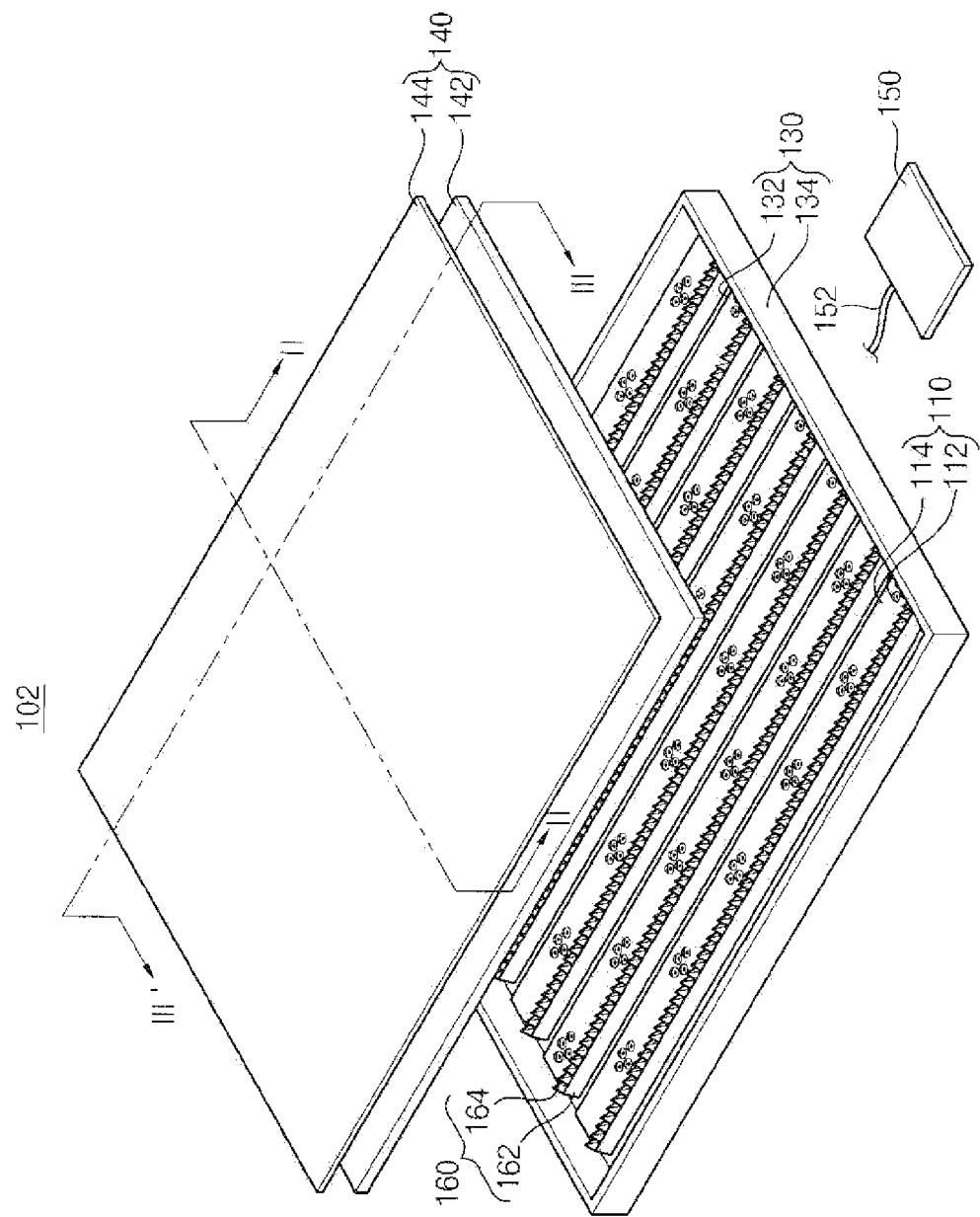
FIG. 7 is an exploded perspective view illustrating a backlight assembly according to another exemplary embodiment of the present invention.
Figure 8:
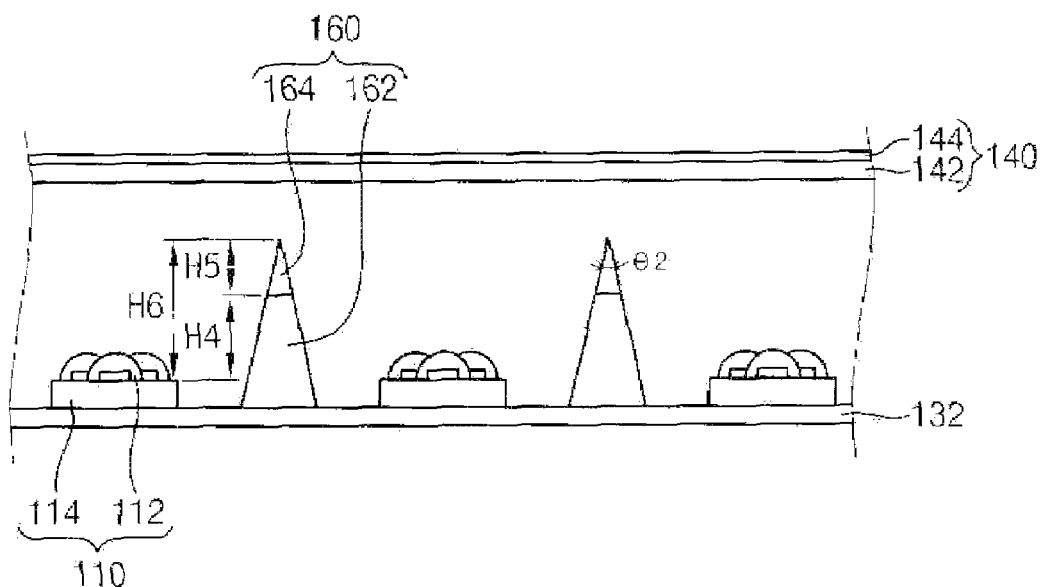
FIG. 8 is a partial cross-sectional view taken along a line II-II' in FIG. 7.
Figure 9:
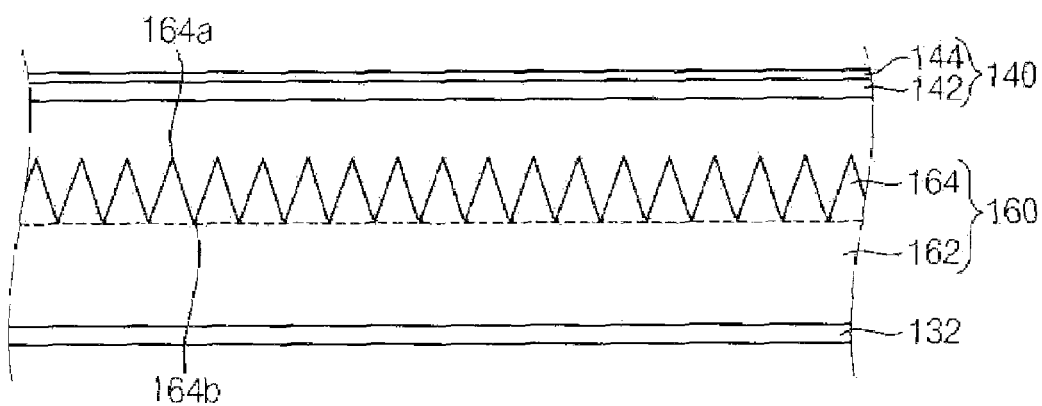
FIG. 9 is a partial cross-sectional view taken along a line III-III' in FIG. 7.

FIG. 7 is an exploded perspective view illustrating a backlight assembly according to another exemplary embodiment of the present invention. FIG. 8 is a partial cross-sectional view taken along a line II-II' in FIG. 7. FIG. 9 is a partial cross-sectional view taken along a line III-III' in FIG. 7.

Referring to FIGS. 7 to 9, a backlight assembly 102 includes a plurality of light source units 110, a partition member 160, a receiving container 130 and an optical member 140. The backlight assembly 102 is substantially the same as the backlight assembly 100 illustrated in FIGS. 1 and 2 except for the partition member 160. The partition member 160 is disposed between the light source units 110. The partition member 160 partially transmits and partially reflects the light generated from the light source units 110. The partition member 160 has a light transmission pattern to partially transmit the light generated from the light source units 110.

In FIGS. 7 to 9, the partition member 160 includes a first partition portion 162 and a second partition portion 164 disposed on the first partition portion 162.

The first partition portion 162 reflects the light generated from the light source units 110. The second partition portion 164 partially transmits and partially reflects the light generated from the light source units 110.

The second partition portion 164 includes a light-reflecting portion and a light-transmitting portion. The light-reflecting portion reflects the light generated from the light source units 110. The light-transmitting portion transmits the light generated from the light source units 110.

The light transmission pattern is formed on the second partition portion 164. In FIGS. 7 to 9 the second partition portion 164 is patterned in a shape of comb teeth. The patterned comb teeth correspond to the light-reflecting portion, and spaces between the comb teeth correspond to the light-transmitting portion. Each of the teeth has a top point 164a and a bottom point 164b.

Figure 10:
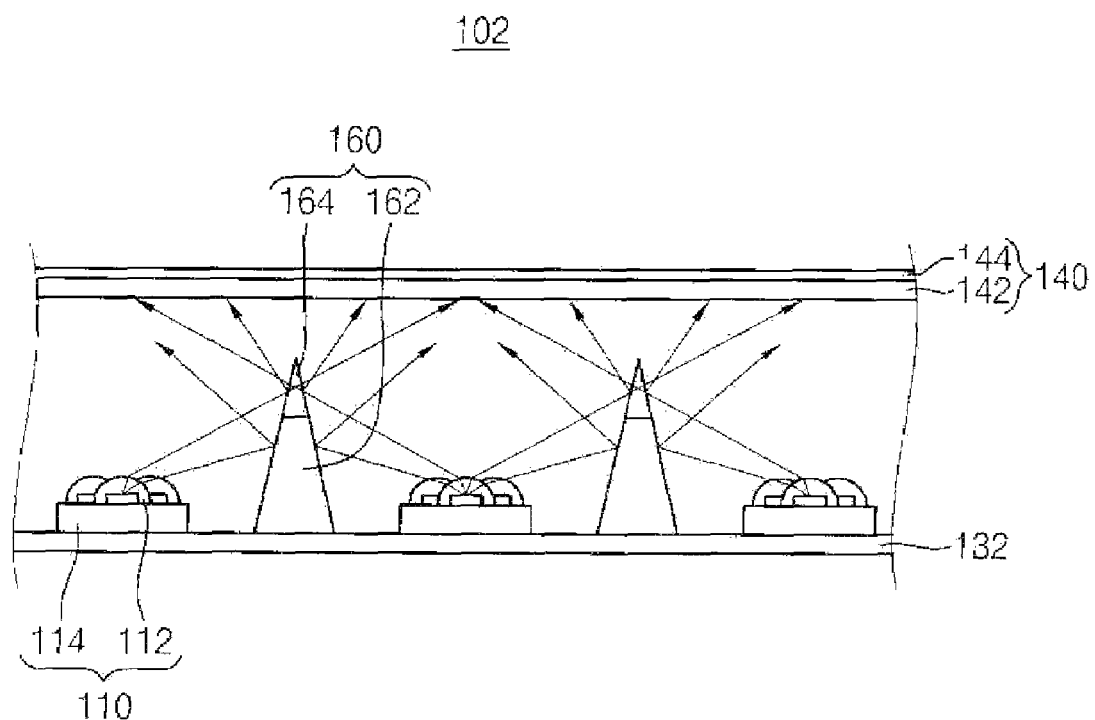
FIG. 10 is a partial cross-sectional view illustrating an optical path in a backlight assembly having the partition member illustrated in FIGS. 7 to 9.

FIG. 10 is a partial cross-sectional view illustrating an optical path in a backlight assembly having the partition member illustrated in FIGS. 7 to 9.

Referring to FIG. 10 the partition member 160 of the backlight assembly 102 according to another exemplary embodiment of the present invention includes the first partition portion 162 and the second partition portion 164 disposed on the first partition portion 162. The second partition portion 164 may be integrally formed with the first partition portion 162.

The first partition portion 162 of the partition member 160 includes a material having a high optical reflectivity. The second partition portion 164 of the partition member 160 is patterned in the shape of comb teeth to partially transmit and partially reflect light. Thus, the partition member 160 may partially reflect and partially transmit the light generated from the light source units 110. The second partition portion 164 may include substantially the same material as the first partition portion 162. Alternatively, the second partition portion 164 may include a different material from the first partition portion 162.

Particularly, as shown in FIG. 10, the light generated from the light source units 110 advances toward the partition member 160. Light generated from the light source units 110 traveling toward the first partition portion 162 is reflected on the first partition portion 162. Light generated from the light source units 110 traveling toward the second partition portion 164 is partially reflected on and partially transmitted through the second partition portion 164. For example, the light generated from the light source units 110 traveling toward the second partition portion 164 is partially reflected on the comb teeth corresponding to the light-reflecting portion, and partially transmitted through the spaces between the comb teeth corresponding to the light-transmitting portion.

The partition member 160 is spaced apart from the optical member 140 by a predetermined interval. As shown in FIG. 8B the first partition portion 162 has a fourth height H4 from the upper face of the circuit board 114 of the light source unit 110, and the second partition portion 164 has a fifth height H5 from an upper face of the first partition portion 162. Thus, the partition member 160 has a sixth height H6 from the upper face of the circuit board 114 of the light source unit 110, the sixth height H6 being equal to a sum of the fourth and fifth heights H4 and H5.

Since the partition member 160 is spaced apart from the optical member 140 by a predetermined interval, a portion of the light generated from the light source unit 110 passes over the top point of the partition member 160 and travels to the position of the adjacent light source unit 110.

A portion of the light generated from the light source unit 110 is reflected on a surface of the first partition portion 162 of the partition member 160 and does not travel to the position of the adjacent light source unit 110.

A portion of the light generated from the light source unit 110 is partially reflected on the comb teeth of the second partition portion 164 of the partition member 160, and is transmitted through the spaces between the comb teeth of the second partition portion 164.

Accordingly, when the fourth height H4 of the first partition portion 162 and the fifth height H5 of the second partition portion 164 are controlled, a portion of the light generated from the light source unit 110 is reflected on the second partition portion 164 corresponding to an upper portion of the partition member 160. The fourth height H4 of the first partition portion 162 and the fifth height H5 of the second partition portion 164 may be formed for color reproducibility of the light generated from the light source unit 110. In addition., a portion of the light generated from the light source unit 110 is transmitted through the second partition portion 164 corresponding to the partition member 160 to mix with the light generated from the adjacent light source units 110.

For example, the fourth height H4 of the first partition portion 162 is greater than or equal to the fifth height H5 of the second partition portion 164.

In an exemplary embodiment, when the optical member 140 is spaced apart from the upper face of the circuit board 114 of the light source unit 110 by a distance of about 50 mm, the fourth height H4 of the first partition portion 162 may have a range of about 20 mm to about 30 mm, and the fifth height H5 of the second partition portion 164 may have a range of about 5 mm to about 25 mm.

When the fourth height H4 of the first partition portion 162 is smaller than about 20 mm, an optical path of the light generated from the light sources 112 forms a predetermined angle with respect to the circuit board 114. Thus, the partition member 160 may not serve as a partition member.

When the fourth height H4 of the first partition portion 162 is greater than about 30 mm or the fifth height H5 of the second partition portion 164 is smaller than about 5 mm, an effect of the first partition portion 162 for reflecting light is dominant over an effect of the second partition portion 164 for partially reflecting and partially transmitting light, and the backlight assembly 102 may have an optical distribution having bands, which is similar in FIGS. 48 and 4C.

When the fifth height H5 of the second partition portion 164 is greater than about 25 mm, an effect of the second partition portion 164 for partially reflecting and partially transmitting light is dominant over an effect of the first partition portion 162 for reflecting light, and the partition member 120 may not serve as a partition member.

Figure 11A:
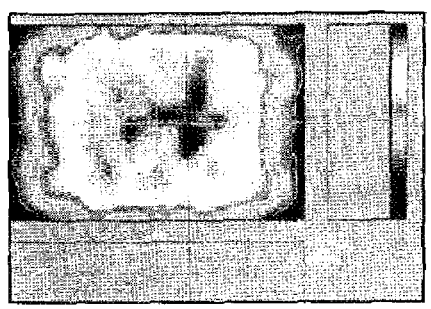
FIGS. 11A to 11C are graphs showing simulation results of optical distributions in accordance with a height of the partition member illustrated in FIGS. 7 to 9.
Figure 11B:
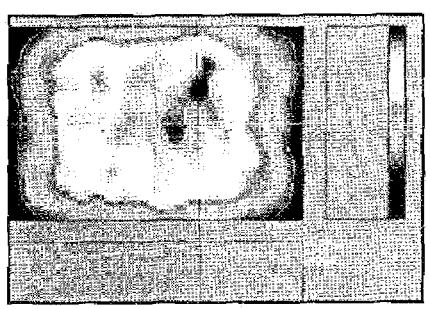
Figure 11C:
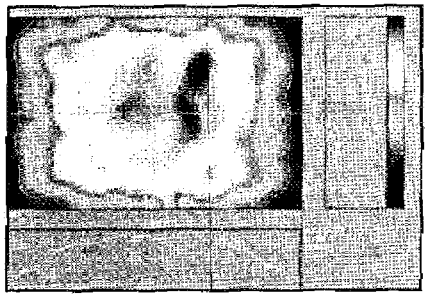

FIGS. 11A to 11C are graphs showing simulation results of optical distributions in accordance with a height of the partition member illustrated in FIGS. 7 to 9. The simulation was performed by using an "Advanced System Analysis Program (ASAP)" (trade name manufactured by Breault Research Organization (BRO) Inc. in U.S.).

In the present exemplary simulation, an interval from the upper face of the circuit board 114 of the light source unit 110 to the optical member 140 is about 50 mm and the fourth height H4 of the first partition portion 162 of the partition member 160 is about 25 mm. FIG. 11A is a graph showing a simulation result of an optical distribution when the fifth height H5 of the second partition portion 164 is about 10 mm. FIG. 11B is a graph showing a simulation result of an optical distribution when the fifth height H5 of the second partition portion 164 is about 15 mm. FIG. 11C is a graph showing a simulation result of an optical distribution when the fifth height H5 of the second partition portion 164 is about 25 mm.

Referring to FIG. 11A, when the fifth height H5 of the second partition portion 164 is about 10 mm and the sixth height H6 of the partition member 160 is about 35 mm, the backlight assembly 102 has a uniform optical distribution. In comparison with an optical distribution illustrated in FIG. 48, when the partition member 160 of the backlight assembly 102 has a height of about 35 mm that is greater than that of the partition member 20 of the backlight assembly 10 illustrated in FIG. 3, the backlight assembly 102 may have more uniform optical distribution.

Referring to FIG. 11B, when the fifth height H5 of the second partition portion 164 is about 15 mm and the sixth height HG of the partition member 160 is about 40 mm, the backlight assembly 102 has a uniform optical distribution. In comparison with an optical distribution illustrated in FIG. 48, when the partition member 160 of the backlight assembly 102 has a height of about 40 mm that is greater than that of the partition member 20 of the backlight assembly 10 illustrated in FIG. 3, the backlight assembly 102 may have more uniform optical distribution.

Referring to FIG. 11C when the fifth height H5 of the second partition portion 164 is about 25 mm and the sixth height H6 of the partition member 160 is about 50 mm, the backlight assembly 102 has a uniform optical distribution. In comparison with an optical distribution illustrated in FIG. 4C, when the partition member 160 of the backlight assembly 102 has a height of about 50 mm that is substantially the same as that of the partition member 20 of the backlight assembly 10 illustrated in FIG. 3, the backlight assembly 102 may have more uniform optical distribution. In comparison with an optical distribution illustrated in FIG. 6C, when the partition member 160 of the backlight assembly 102 has a height of about 50 mm that is substantially the same as that of the partition member 120 of the backlight assembly 100 illustrated in FIGS. 1 and 2, the backlight assembly 102 may have a more uniform optical distribution.

In FIGS. 11A to 11C, the backlight assembly 102 may have a uniform optical distribution because a portion of the light generated from the light source unit 110 is reflected on the surface of the first partition portion 162 disposed at a lower portion of the partition member 160, but a portion of the light generated from the light source unit 110 is transmitted through the second partition portion 164 disposed at an upper portion of the partition member 160, and particularly transmitted through the spaces between the comb teeth.

Referring again to FIGS. 7 to 9, the partition member 160 has, for example, a column shape having a triangular cross-sectional profile. The triangular cross-sectional profile of the partition member 160 may be an equilateral triangle. A vertex angle θ2 of the partition member 160, for example, has a range of about 1 degree to about 15 degrees.

Other configurations may be implemented, for example, the partition member 160 may have a column shape having a cross-sectional profile of a truncated triangle. For example, the cross-sectional profile of the partition member 160 may be a parallelogram, an upper side of which is smaller than a lower side. A vertex angle of the triangle defined by extending left and right sides of the parallelogram may have a range of about 1 degree to about 15 degrees.

As shown in FIGS. 7 and 8, a first side face of the first partition portion 162 and a second side face of the second partition portion 164 are continuous. The first side face of the first partition portion 162 and the bottom plate 132 of the receiving container 130 forms a first inclined angle, and the second side face of the second partition portion 164 and the bottom plate 132 of the receiving container 130 forms a second inclined angle. The first inclined angle is substantially the same as the second inclined angle.

Other configurations may be implemented, for example, the first inclined angle formed by the first side face of the first partition portion 162 and the bottom plate 132 of the receiving container 130 may be different from the second inclined angle formed by the second side face of the second partition portion 164 and the bottom plate 132 of the receiving container 130.

The fourth height H4 of the first partition portion 162, the fifth height H5 of the second partition portion 164, the sixth height HG of the partition member 160 the vertex angle θ2 of the partition member 160, etc. may be set in accordance with a dimension and a configuration of the backlight assembly 102. For example, The fourth height H4 of the first partition portion 162, the fifth height H5 of the second partition portion 164, the sixth height H6 of the partition member 160, the vertex angle θ2 of the partition member 160, etc. may be changed by a height and a shape of the backlight assembly 102, a position of the optical member 140, positions of the light source units 110, an arrangement of the light sources 112, etc.

Figure 12:
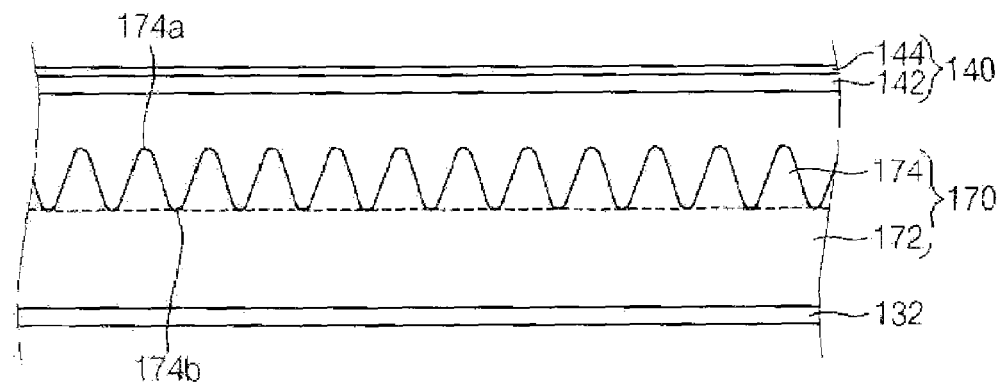
FIG. 12 is a partial cross-sectional view illustrating a partition member of a backlight assembly according to still another exemplary embodiment of the present invention.

FIG. 12 is a partial cross-sectional view illustrating a partition member of a backlight assembly according to still another exemplary embodiment of the present invention.

Referring to FIG. 12, a backlight assembly 104 includes a plurality of light source units 110, a partition member 170, a receiving container 130 and an optical member 140. The backlight assembly 104 is substantially the same as the backlight assembly 102 illustrated in FIGS. 7 to 9 except for a top point 174a and a bottom point 174b of comb teeth of the partition member 170.

The partition member 170 includes a first partition portion 172 and a second partition portion 174 disposed on the first partition portion 172.

In FIG. 12 the second partition portion 174 is patterned in the shape of comb teeth. At least one of the top point 174a and the bottom point 174b of the comb teeth may be rounded. In FIG. 12, both of the top point 174a and bottom point 174b are rounded.

Figure 13:
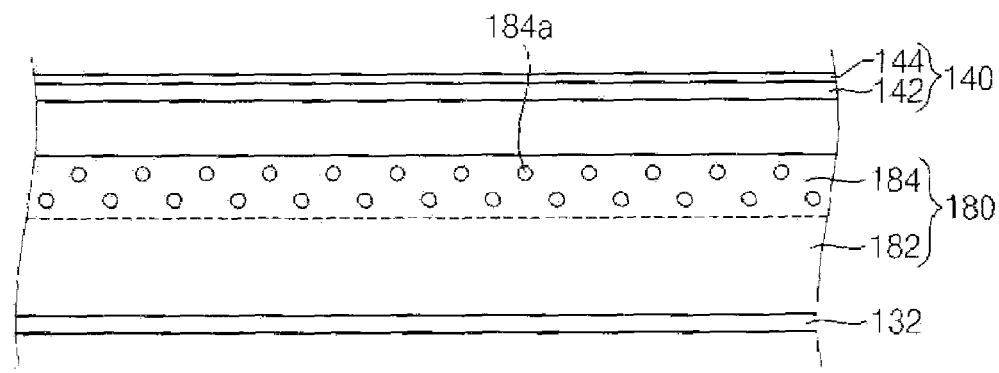
FIG. 13 is a partial cross-sectional view illustrating a partition member of a backlight assembly according to still another exemplary embodiment of the present invention.

FIG. 13 is a partial cross-sectional view illustrating a partition member of a backlight assembly according to still another exemplary embodiment of the present invention.

Referring to FIG. 13, a backlight assembly 106 includes a plurality of light source units 110, a partition member 180, a receiving container 130 and an optical member 140. The backlight assembly 106 is substantially the same as the backlight assembly 102 illustrated in FIGS. 7 to 9 except for a shape of a second partition portion 184 of the partition member 180.

The second partition portion 184 partially transmits and partially reflects the light generated from the light source units 110.

The second partition portion 184 includes a light-reflecting portion and a light-transmitting portion. The light-reflecting portion reflects the light generated from the light source units 110. The light-transmitting portion transmits the light generated from the light source units 110.

A plurality of holes 184a is formed at the second partition portion 184. The holes 184a correspond to the light-transmitting portion, and portions between the holes correspond to the light-reflecting portion. Thus, the partition member 180 may partially reflect and partially transmit the light generated from the light source units 110. The second partition portion 184 may include substantially the same material as the first partition portion 182. Alternatively, the second partition portion 184 may include a different material from the first partition portion 182.

The light generated from the light source units 110 travels toward the partition member 180. Light generated from the light source units 110 traveling toward the first partition portion 182 is reflected on the first partition portion 182. In contrast, light generated from the light source units 110 traveling toward the second partition portion 184 is partially reflected on and partially transmitted through the second partition portion 184. For example, the light generated from the light source units 110 traveling toward the second partition portion 184 is partially transmitted through the holes 184a corresponding to the light-transmitting portion, and partially reflected on the portions between the holes 184a corresponding to the light-reflecting portion.

In FIG. 13, the holes 184a are regularly arranged. Alternatively, the holes 184a may be irregularly arranged.

In FIG. 13, the holes 184a have substantially the same size. Alternatively, the holes 184a may have different sizes from each other. For example, the holes 184a may have gradually larger sizes from a lower portion to an upper portion of the second partition portion 184 so that the second partition portion 184 has a greater optical transmissivity in the upper portion than in the lower portion.

In FIG. 13, each of the holes 184a has a circular shape. Alternatively, the holes 142a may have various shapes, for example, a triangular shape, a quadrangular shape, etc.

In FIG. 13, the holes 184a have substantially the same shape. Alternatively, the holes 184a may have different shapes from each other. For example, some of the holes 184a have a circular shape, and some of the holes 184a have a triangular shape or a quadrangular shape.

Figure 14:
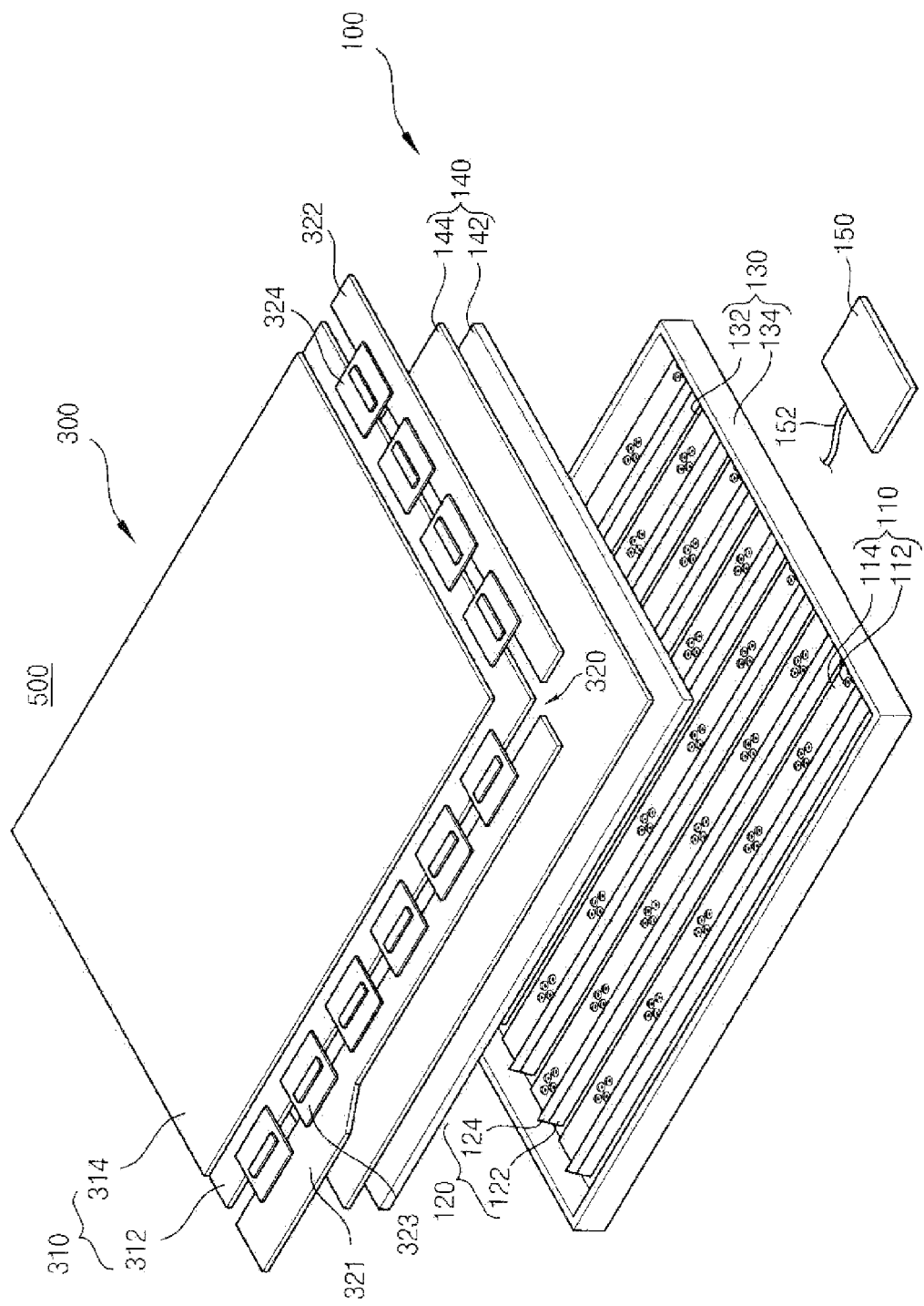
FIG. 14 is an exploded perspective view illustrating a liquid crystal display device according to an exemplary embodiment of the present invention.

FIG. 14 is an exploded perspective view illustrating a liquid crystal display device according to an exemplary embodiment of the present invention.

Referring to FIG. 14, a liquid crystal display (LCD) device 500 includes a backlight assembly 100 and a display unit 300.

The backlight assembly 100 is substantially the same as the backlight assembly 100 illustrated in FIGS. 1 and 2. The display unit 300 includes an LCD panel 310 displaying an image using light provided from the backlight assembly 100 and a driver circuit part 320 driving the LCD panel 310.

The LCD panel 310 includes a first substrate 312, a second substrate 314 facing and coupled to the first substrate 312, and a liquid crystal layer (not shown) interposed between the first substrate 312 and the second substrate 314.

For example, the first substrate 312 includes a thin film transistor (TFT) serving as a switching element and a pixel electrode (not shown) electrically connected to the TFT.

For example, the second substrate 314 includes a common electrode (not shown). Since the LCD device 500 employs a field sequential driving method, in which a red light, a green light and a blue light are sequentially emitted for one frame and each of the red, green and blue light is emitted for a predetermined time to thereby generate a desired color, the second substrate 314 does not include a color filter layer.

The driver circuit part 320 includes a data printed circuit board 321 providing a data driving signal to the LCD panel 310, a gate printed circuit board 322 providing a gate driving signal to the LCD panel 310, a data driving circuit film 323 electrically connecting the data printed circuit board 321 to the LCD panel 310 and a gate driving circuit film 324 electrically connecting the gate printed circuit board 322 to the LCD panel 310.

In FIG. 14, the LCD device 500 employs the backlight assembly 100 illustrated in FIGS. 1 and 2. Other configurations may be implemented, for example the LCD device 500 may employ one of the backlight assemblies 102, 104 and 106 illustrated in FIGS. 7, 12 and 13, respectively.

According to an embodiment of the present invention, a partition member disposed between light source units includes a first partition portion and a second partition portion disposed on the first partition portion. Thus, when light generated from the light source units is incident onto the second partition portion, the partition member may partially transmit and partially reflect the light generated from the light source units.

Accordingly, the light generated from the light source units is partially reflected on the second partition portion corresponding to an upper portion of the partition member to substantially prevent color reproducibility of the light from being lowered, and the light generated from the light source units are partially transmitted through the second partition portion to allow the light generated from the light source units adjacent to each other to be mixed.

Therefore, the partition member is set to have a high height, thereby increasing the color reproducibility of the light, and the light is also mixed to improve uniformity of the light.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a plurality of light source units, each of the light source units comprising a plurality of light sources each configured to generate light having different wavelengths from each other, and a circuit board on which the light sources are mounted; and
   a partition member disposed between the light source units to partially transmit and partially reflect the light generated from the light source units and incident on the partition member.

2. The backlight assembly of claim 1, wherein the partition member comprises:
   a first partition portion; and
   a second partition portion disposed on the first partition portion.

3. The backlight assembly of claim 2, wherein the first partition portion includes a first material, and the second partition portion includes a second material that is different from the first material.

4. The backlight assembly of claim 3, wherein the first material has a first optical reflectivity and the second material has a second optical reflectivity that is smaller than the first optical reflectivity.

5. The backlight assembly of claim 4, wherein the partition member further comprises a third partition portion disposed on the second partition portion and including a third material having a third optical reflectivity smaller than the second optical reflectivity.

6. The backlight assembly of claim 3, wherein the second partition portion has a refractive index of about 1.0 to about 2.0.

7. The backlight assembly of claim 3, wherein the second partition portion includes at least one of polymethyl methacrylate (PMMA) and polycarbonate (PC).

8. The backlight assembly of claim 2, wherein the first partition portion is configured to reflect the light generated from the light source units and the second partition portion is configured to partially transmit and partially reflect the light generated from the light source units.

9. The backlight assembly of claim 2, wherein the second partition portion comprises,
   a light-reflecting portion configured to reflect the light generated from the light source units; and
   a light-transmitting portion configured to transmit the light generated from the light source units.

10. The backlight assembly of claim 9, wherein the second partition portion is patterned in a shape of comb teeth.

11. The backlight assembly of claim 10, wherein each of the comb teeth are rounded at least one of a top point and a bottom point.

12. The backlight assembly of claim 9, wherein a plurality of holes is formed at the second partition portion.

13. The backlight assembly of claim 2, wherein a first height of the first partition portion is greater than or equal to a second height of the second partition portion.

14. The backlight assembly of claim 13, wherein the first height of the first partition portion is in a range of about 20 mm to about 30 mm, and the second height of the second partition portion is in a range of about 5 mm to about 25 mm.

15. The backlight assembly of claim 1, wherein the partition member has a column shape having a cross-sectional profile of one of a triangle and a truncated triangle.

16. The backlight assembly of claim 15, wherein a vertex angle of the triangle and the truncated triangle is in a range of about 1 degree to about 15 degrees.

17. The backlight assembly of claim 1, further comprising a reflective sheet configured to reflect the light generated from the light source units, and the light source units and the partition member are disposed on the reflective sheet.

18. A backlight assembly comprising:
   a plurality of light source units, each of the light source units comprising a plurality of light sources each configured to generate light having different wavelengths from each other, and a circuit board on which the light sources are mounted; and
   a partition member disposed between the light source units to partially transmit and partially reflect the light generated from the light source units, wherein the partition member includes at least two materials.

19. The backlight assembly of claim 18, wherein an optical reflectivity of the partition member gradually decreases from a lower portion to an upper portion of the partition member.

20. A display device comprising:
a display unit configured to display an image using lights and a backlight assembly configured to provide the light to the display unit, the backlight assembly comprising a plurality of light source units, each of the light source units comprising a plurality of light sources, each light source configured to generate different wavelengths of the light from each other and a circuit board on which the light sources are mounted, and a partition member disposed between the light source units to partially transmit and partially reflect the light generated from the light source units and incident on the partition member.

* * * * *